No. 793,699.

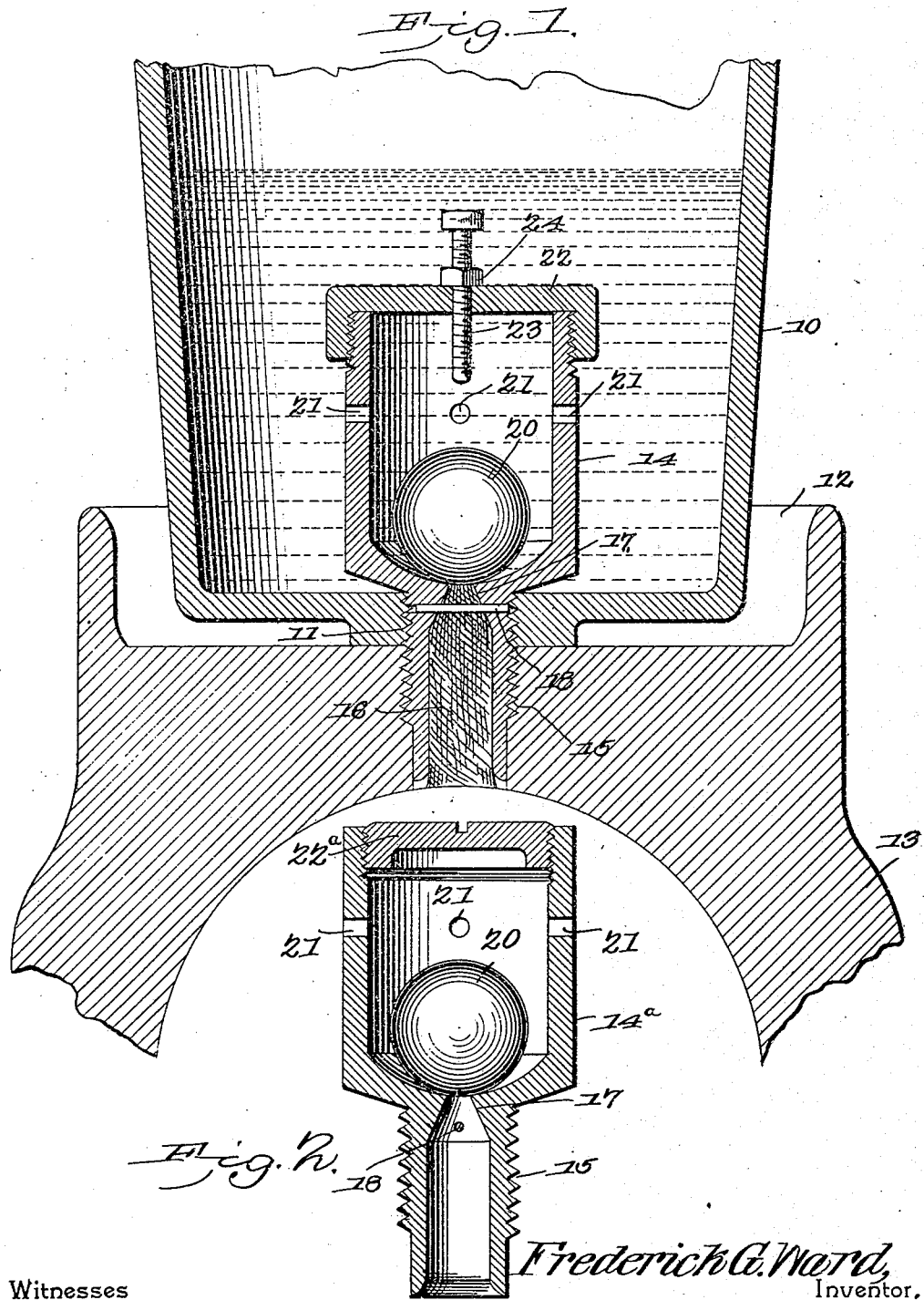

Patented July 4, 1905.

UNITED STATES PATENT OFFICE.

FREDERICK G. WARD, OF PITTSBURG, PENNSYLVANIA.

LUBRICATOR.

SPECIFICATION forming part of Letters Patent No. 793,699, dated July 4, 1905.

Application filed August 20, 1904. Serial No. 221,786.

*To all whom it may concern:*

Be it known that I, FREDERICK G. WARD, a citizen of the United States, residing at Pittsburg, in the county of Allegheny and State of Pennsylvania, have invented a new and useful Lubricator, of which the following is a specification.

This invention relates to automatic lubricators for machinery-bearings of various kinds, more particularly to the bearings of the electric motors of railway or trolley lines and similar machinery, and has for its object to produce a simply-constructed device which will permit the feeding of the lubricating material or compound while the machinery is in motion and automatically shut off the flow, and thereby avoid waste, when the machinery is not in motion.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

Figure 1 is a sectional elevation of the improved device applied. Fig. 2 is a sectional detail illustrating a modification in the construction.

The improved device comprises a reservoir or receptacle 10 for the lubricating material, provided with a threaded aperture 11 and adapted for the position within the usual oil-feed pocket 12 of a shaft-bearing cap 13.

A valve-casing 14 is provided for insertion within the casing 10 and formed with a threaded stud 15 for engaging the threaded aperture 11 and of sufficient length to extend below the lower surface of the casing 10 and into a threaded aperture in the bearing 13, the valve-casing and its threaded stud thus serving as a means for binding the receiver 10 firmly to the bearing. The stud 15 is hollow, as shown, to receive a conductor-wick 16, the upper end of the stud-aperture tapering inwardly, as at 17, to contract and compress the upper end of the wick. The stud 15 is also provided with transverse apertures to receive a pin 18 for holding the wick in position and prevent it from being displaced by the jarring or agitation of the bearing.

A globular valve 20 is seated by gravity within the casing 10, and the casing is also provided with a plurality of spaced inlet-apertures 21 for the passage of the lubricating material. The apertures 21 are located at a considerable distance above the floor of the receptacle 10, whereby a relatively large sediment-chamber is provided to receive any foreign matter which may find its way into the receptacle, and thus prevent it from passing into the valve-casing. The valve-casing is provided with a screw-cap 22 to close the same and prevent the displacement of the valve.

A threaded stop-pin 23 will preferably be employed with a cap 22 to limit the movement of the valve 20 and to prevent undue agitation of the same, the pin being provided with a jam-nut 24 to lock it in the required position.

Instead of having the cap constructed as shown in Fig. 1, with a depending threaded flange to embrace the valve-casing, the cap may be in the form of a plug $22^a$, packed into the upper end of the valve-casing $14^a$, as shown in Fig. 2, and will be found thoroughly efficient for the purposes designed.

By this simple arrangement it will be obvious that so long as the bearing 13 remains stationary the valve 20 will automatically seat itself within the casing 10 and shut off all flow of oil to the conductor-wick 16; but when the machinery is in motion the lateral agitation of the same will displace the valve and permit the lubricating material to flow. The moment the bearing becomes stationary, therefore, the supply of the lubricant will cease and be thus avoided.

The device is very simple in construction, effective in action, and may be adapted to any of the various forms of bearings in common use, but, as before stated, is especially adapted to the bearings of the motors employed upon electric trolley-lines.

Having thus described the invention, what is claimed is—

1. In a lubricator, a reservoir for the lubricant having a threaded aperture, a valve-casing having intermediate transverse oil-inlet apertures, and a relatively elongated threaded stud for engaging said threaded aperture and extending in advance of the same for engaging a threaded aperture in the bearing to be lubricated, said stud having an internal cavity tapered inwardly adjacent to the valve-seat for receiving a conductor-wick, and provided with transverse apertures to receive a holding-pin to support the wick in position, and a valve seated by gravity within said valve-casing for displacement by the agitation of the bearing and the reservoir and attachments of the same.

2. In a lubricator, a reservoir for the lubricant having a threaded aperture, a valve-casing having intermediate transverse oil-inlet apertures, and a relatively elongated threaded stud for engaging said threaded aperture and extending in advance of the same, said stud having an internal cavity for a conductor-wick tapering at the end adjacent to the seat in said valve-casing and provided with transverse apertures for receiving a holding-pin for supporting the wick in position, and a valve seated by gravity within said casing for displacement by the agitation of the bearing and the reservoir and attachments of the same.

3. In a lubricator, a reservoir for the lubricant having a threaded aperture, a valve-casing having intermediate transverse oil-inlet apertures, and a relatively elongated threaded stud for engaging said threaded aperture and extending in advance of the same, said stud having an internal cavity for a conductor-wick tapering at the end adjacent to the seat in said valve-casing and provided with transverse apertures for receiving a holding-pin for supporting the wick in position, a valve seated by gravity within said casing for displacement by the agitation of the bearing and the reservoir and attachments of the same, and means carried by the valve-casing to limit the movement of the valve.

In testimony that I claim the foregoing as my own I have hereto affixed my signature in the presence of two witnesses.

FREDERICK G. WARD.

Witnesses:
J. B. CROOKS,
CHAS. J. MERZ.